(12) United States Patent
Iwakiri

(10) Patent No.: US 11,267,320 B2
(45) Date of Patent: Mar. 8, 2022

(54) VEHICLE INTERIOR STRUCTURE, INTERIOR MEMBER USED THEREFOR, METHOD FOR PRODUCING THE SAME, AND METHOD FOR PRODUCING POLARIZING MEMBER

(71) Applicant: TOYOTA JIDOSHA KABUSHIKI KAISHA, Toyota (JP)

(72) Inventor: Masashi Iwakiri, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/800,349

(22) Filed: Feb. 25, 2020

(65) Prior Publication Data

US 2020/0189365 A1 Jun. 18, 2020

Related U.S. Application Data

(62) Division of application No. 16/041,926, filed on Jul. 23, 2018, now abandoned.

(30) Foreign Application Priority Data

Sep. 19, 2017 (JP) .............................. JP2017-178528

(51) Int. Cl.
*B60J 3/06* (2006.01)
*B32B 27/30* (2006.01)

(52) U.S. Cl.
CPC .............. *B60J 3/06* (2013.01); *B32B 27/306* (2013.01); *B32B 2255/10* (2013.01);
(Continued)

(58) Field of Classification Search
CPC ...... B60J 3/06; B32B 27/306; B32B 2255/10; B32B 307/406; B32B 307/416; B32B 605/003
(Continued)

(56) References Cited

U.S. PATENT DOCUMENTS 4,311,365 A 1/1982 Tsuda et al.
6,859,241 B2 * 2/2005 Hamamoto .......... G02B 5/3033
349/96
(Continued)

FOREIGN PATENT DOCUMENTS

CN 1412579 A 4/2003
CN 102529098 A * 7/2012
(Continued)

OTHER PUBLICATIONS

CN 098 machine translation (Year: 2012).*
Communication dated Dec. 9, 2019 in U.S. Appl. No. 16/041,926 from U.S. Patent and Trademark Office.

*Primary Examiner* — Hilary L Gutman
(74) *Attorney, Agent, or Firm* — Sughrue Mion, PLLC

(57) ABSTRACT

Provided are a vehicle interior structure in which a burden for passengers caused by reflected light generated due to a mirror phenomenon and the like can be reduced while at the same time the design can be enhanced, an interior member used therefor, a method for producing the same, and a method for producing a polarizing member. An instrument panel as an interior member includes a glossy portion and a polarizing layer formed on the surface of the glossy portion, the glossy portion being adapted to reflect light coming through a windshield and the polarizing layer being adapted to absorb optical oscillation components in the vehicle width direction.

1 Claim, 3 Drawing Sheets

(52) U.S. Cl.
CPC ... *B32B 2307/406* (2013.01); *B32B 2307/416* (2013.01); *B32B 2307/42* (2013.01); *B32B 2605/003* (2013.01)

(58) Field of Classification Search
USPC ...................................................... 296/96.19
See application file for complete search history.

(56) References Cited

U.S. PATENT DOCUMENTS

| | | | |
|---|---|---|---|
| 2009/0097125 A1* | 4/2009 | Munro .................... | B60R 13/02 359/614 |
| 2010/0008958 A1* | 1/2010 | Mundschau ............. | A61K 8/37 424/401 |
| 2010/0157426 A1 | 6/2010 | Matsunami et al. | |
| 2015/0301253 A1* | 10/2015 | Henry ...................... | C09D 4/06 351/49 |
| 2016/0085008 A1 | 3/2016 | Banerjee et al. | |
| 2016/0144582 A1* | 5/2016 | Ihara ...................... | G02B 1/041 351/159.56 |
| 2016/0176131 A1* | 6/2016 | Ihara ................ | B29D 11/00413 264/1.32 |
| 2017/0299774 A1 | 10/2017 | Guo et al. | |
| 2018/0104886 A1* | 4/2018 | Nagata .................... | B32B 15/12 |
| 2019/0160726 A1* | 5/2019 | Yamada .................. | B32B 27/02 |
| 2019/0317325 A1 | 10/2019 | Malinovskaya et al. | |

FOREIGN PATENT DOCUMENTS

| | | | |
|---|---|---|---|
| JP | 5519668 | A | 2/1980 |
| JP | 3120434 | U | 12/2000 |
| JP | 2004-130916 | A | 4/2004 |
| JP | 2006-56413 | A | 3/2006 |
| JP | 3120434 | U | 4/2006 |
| JP | 2011232767 | A | 11/2011 |

\* cited by examiner

VEHICLE INTERIOR STRUCTURE, INTERIOR MEMBER USED THEREFOR, METHOD FOR PRODUCING THE SAME, AND METHOD FOR PRODUCING POLARIZING MEMBER

CROSS REFERENCE TO RELATED APPLICATIONS

The present application is a divisional of U.S. application Ser. No. 16/041,926 filed on Jul. 23, 2018, claims priority from Japanese patent application JP 2017-178528 filed on Sep. 19, 2017, the content of each of which is hereby incorporated by reference in its entirety.

BACKGROUND

Technical Field

The present disclosure relates to a vehicle interior structure in which an interior member (for example, an instrument panel) and glass (for example, a windshield) overlap in the vertical direction, an interior part used therefor, a method for producing the same, and a method for producing a polarizing member.

Background Art

When a vehicle such as an automobile runs, an object in the vehicle cabin may be produced as reflected light on the windshield due to a mirror phenomenon and the like (which is also referred to as mirror-like reflection or reflection in the window). In such a case, passengers in the vehicle cabin, in particular, a driver has an obstructed field of view and thus may not have a good field of view, accompanying eye fatigue in some cases. In particular, if a very glossy (highly reflective) member (for example, a highly reflective decorative layer such as a metal, metal-like, or metallic member) is arranged in the vehicle cabin, too strong reflected light may be generated, which can give a feeling of discomfort to the driver.

As a technique for reducing such reflected light generated due to a mirror phenomenon and the like, there is known a technique of laying a light-absorbing sheet, which has been processed to have a black tone, on an instrument panel located below a windshield ahead of passengers in a vehicle cabin, thereby blocking reflected light from the instrument panel on the windshield (for example, see JP 3120434 U).

SUMMARY

However, since the color of the light-absorbing sheet arranged on the instrument panel to prevent reflection in the window in the background art described in JP 3120434 U is limited to a dark color such as black, the design of the sheet is degraded.

The present disclosure has been made in view of the foregoing, and exemplary embodiments relate to providing a vehicle interior structure in which a burden for passengers caused by reflected light generated due to a mirror phenomenon and the like can be reduced while at the same time the design can be enhanced, an interior member used therefor, a method for producing the same, and a method for producing a polarizing member.

Accordingly, a vehicle interior structure in accordance with the present disclosure is a vehicle interior structure including an interior member and glass with a portion overlapping the interior member in the vertical direction, in which the interior member has a glossy portion and a polarizing layer provided on a surface of the glossy portion, the glossy portion being adapted to reflect light coming through the glass, and the polarizing layer being adapted to absorb optical oscillation components in the vehicle width direction.

The interior member is preferably a member provided in the front part of the vehicle ahead of a driver seat and a front passenger seat, and the glass is preferably a windshield.

In addition, the interior member in accordance with the present disclosure is an interior member arranged at a position overlapping glass of a vehicle in the vertical direction, the interior member including a glossy portion adapted to reflect light coming through the glass; and a polarizing layer provided on a surface of the glossy portion, the polarizing layer being adapted to absorb optical oscillation components in the vehicle width direction.

A method for producing an interior member in accordance with the present disclosure is a method for producing an interior member, the interior member being adapted to be arranged at a position overlapping glass of a vehicle in the vertical direction, the method including preparing an interior member with a glossy portion, the glossy portion being adapted to reflect light coming through the glass; humidifying and swelling a film so as to plasticize the film; stretching the plasticized film in the vehicle width direction so as to shape the plasticized film in conformity with a surface shape of the glossy portion of the interior member while at the same time providing the film with a polarizing property to absorb optical oscillation components in the vehicle width direction, and attaching the film being stretched to a surface of the glossy portion; and drying the attached film.

The method for producing an interior member preferably further includes forming a coating layer on a surface of the polarizing layer made of the dried film, the coating layer being adapted to protect the polarizing layer.

A method for producing a polarizing member in accordance with the present disclosure is a method for producing a polarizing member adapted to absorb optical oscillation components in a single direction, the method including humidifying and swelling a film so as to plasticize the film; stretching the plasticized film in a single direction so as to shape the plasticized film in conformity with a surface shape of a target member while at the same time providing the film with a polarizing property to absorb optical oscillation components in the single direction, and attaching the film being stretched to a surface of the target member; and drying the attached film.

The method for producing a polarizing member preferably further includes forming a coating layer on a surface of the polarizing layer made of the dried film, the coating layer being adapted to protect the polarizing layer.

According to the present disclosure, the polarizing layer provided on the surface of the glossy portion absorbs s-polarized light (optical oscillation components of the incident sunlight in the vehicle width direction), and passes p-polarized light therethrough. Therefore, the glossy portion reflects only p-polarized light. Since the p-polarized light (optical oscillation components of the incident sunlight in the vehicle length direction) is the optical oscillation components perpendicular to glass (for example, the windshield), the Brewster's angle at which no reflection occurs is present, and thus reflection can be weakened (if s-polarized light is present, there will be no Brewster's angle, and thus reflection tends to become stronger). Therefore, light coming through the glass and reflected by the glossy portion is not reflected much by the inner surface of the glass, which can reduce a feeling of discomfort to a driver. Therefore, a burden for the driver caused by reflected light generated due to a mirror phenomenon and the like can be reduced while at the same time the design can be enhanced.

DETAILED DESCRIPTION

Hereinafter, an embodiment of the present disclosure will be described with reference to the drawings.

[Vehicle Interior Structure and Configuration of Instrument Panel as Interior Member Thereof]

Figure 1:
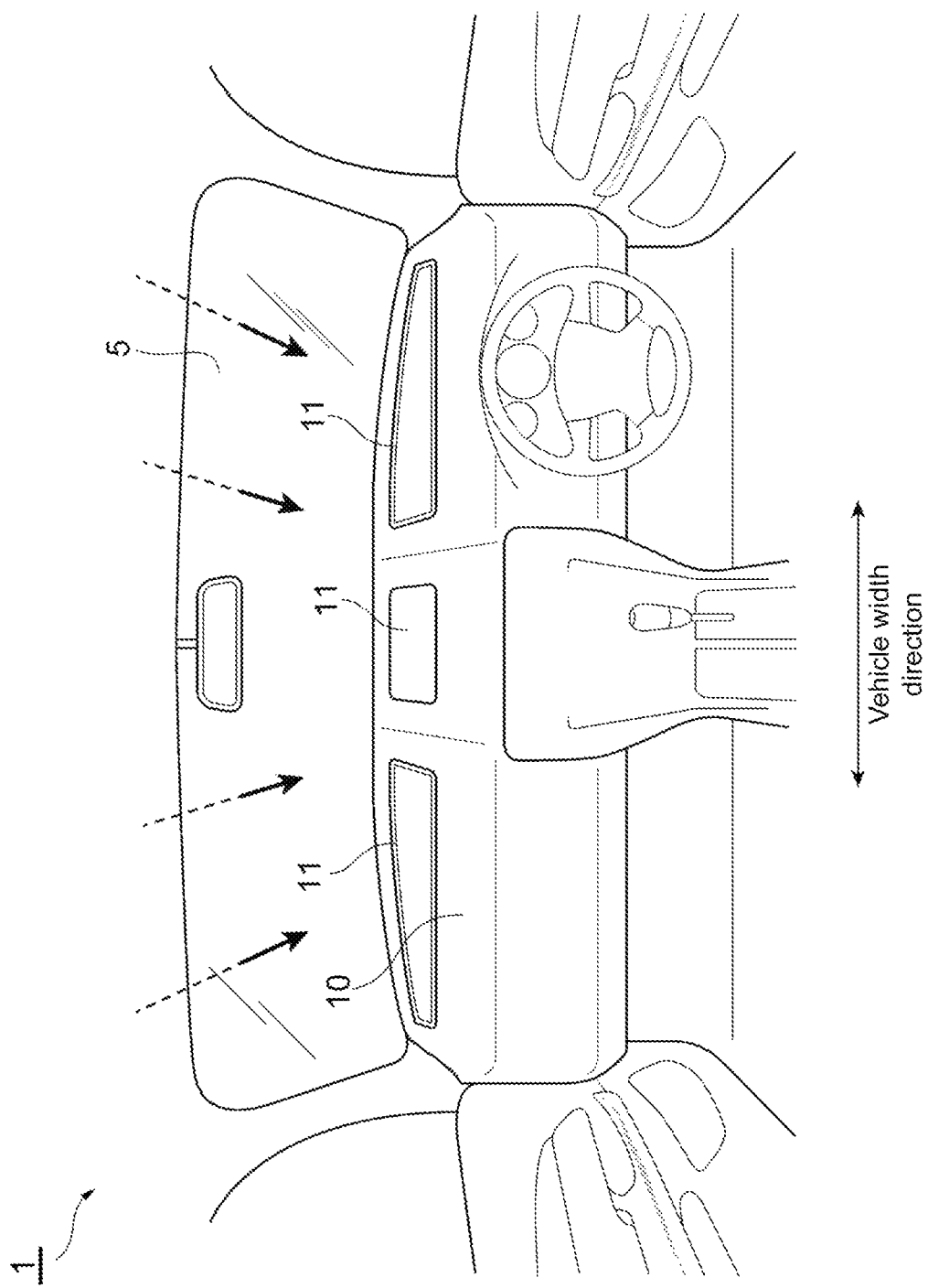
FIG. 1 is a perspective view illustrating a schematic configuration of an embodiment of a vehicle interior structure in accordance with the present disclosure.

FIG. 1 is a perspective view of a schematic configuration of an embodiment of a vehicle interior structure in accordance with the present disclosure as seen from the interior side of the vehicle.

In a vehicle 1 of an embodiment illustrated in the drawing, an instrument panel 10 produced from polypropylene (PP) resin or the like is disposed below a windshield 5, which is provided in an inclined manner in the front part of the vehicle 1, in the vertical direction (at a position where the instrument panel 10 overlaps the windshield 5 in the vertical direction) in the front part of the vehicle 1 ahead of the driver seat and the front passenger seat. In addition, a glossy portion 11 that reflects light coming through the windshield 5 is provided on an upper surface of the instrument panel 10. It is obvious that the position, size, shape, and range of the glossy portion 11 are not limited to those illustrated in the drawing and can be changed as appropriate.

Examples of the glossy portion 11 herein include a highly reflective decorative layer, such as a metal, metal-like, or metallic member including plating, an aluminum decorative plate, a metal-deposited film, or the like; and a material that emits strong light, such as an instrument panel with lighting and a monitor display.

Figure 2:
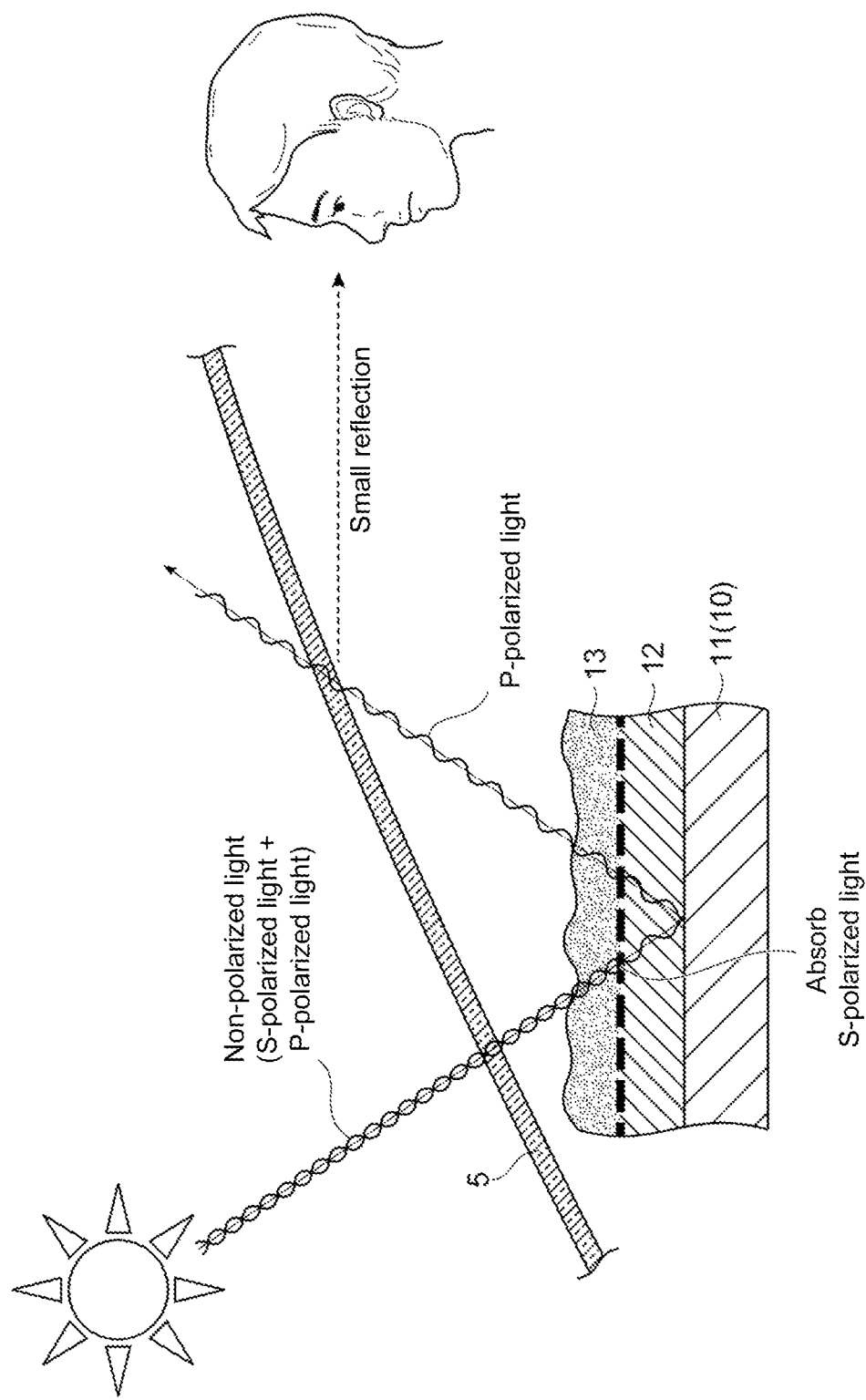
FIG. 2 is an enlarged cross-sectional view of the primary portion in FIG. 1.

In addition, in this example, as can be clearly seen from FIG. 2, a polarizing layer 12 that absorbs optical oscillation components in the vehicle width direction is provided on the surface of the glossy portion 11, and further, a coating layer 13 as an antireflective and protective layer is provided on the surface of the polarizing layer 12 for purposes of protecting the polarizing layer 12, preventing scratching thereon, and preventing surface reflection, for example.

The polarizing layer 12 is formed by uniaxially stretching a film and attaching it to the surface of the glossy portion 11 (which will be described in detail later). As the film for forming the polarizing layer 12, a resin film, such as polyvinyl alcohol (PVA), polyvinyl acetal, or polyvinyl butyral (PVB), is used, for example.

The coating layer 13 is desirably formed using a material with as small optical anisotropy as possible, and is preferably formed using, for example, resin with a low photoelastic coefficient including cellulose acetate such as cellulose triacetate or cellulose diacetate; propyl cellulose such as tripropyl cellulose or dipropyl cellulose; polymethyl methacrylate; resin having a hydrocarbon on its main chain, such as an adamantane ring or a cyclopentane ring; polyamide; or polyurethane. Among them, acyl cellulose-based resin, such as cellulose acetate or propyl cellulose, which is inexpensive, is preferably used.

In the vehicle 1 with such a configuration, the polarizing layer 12 provided on the surface of the glossy portion 11 absorbs s-polarized light (optical oscillation components of the incident sunlight in the vehicle width direction), and passes p-polarized light therethrough as illustrated in FIG. 2. Therefore, the glossy portion 11 reflects only p-polarized light. Since the p-polarized light (optical oscillation components of the incident sunlight in the vehicle length direction) is the optical oscillation components perpendicular to the windshield 5, the Brewster's angle at which no reflection occurs can be provided by adjusting the inclination of the windshield 5, and thus reflection can be reduced.

[Method for Producing Instrument Panel as Interior Member]

Figure 3:
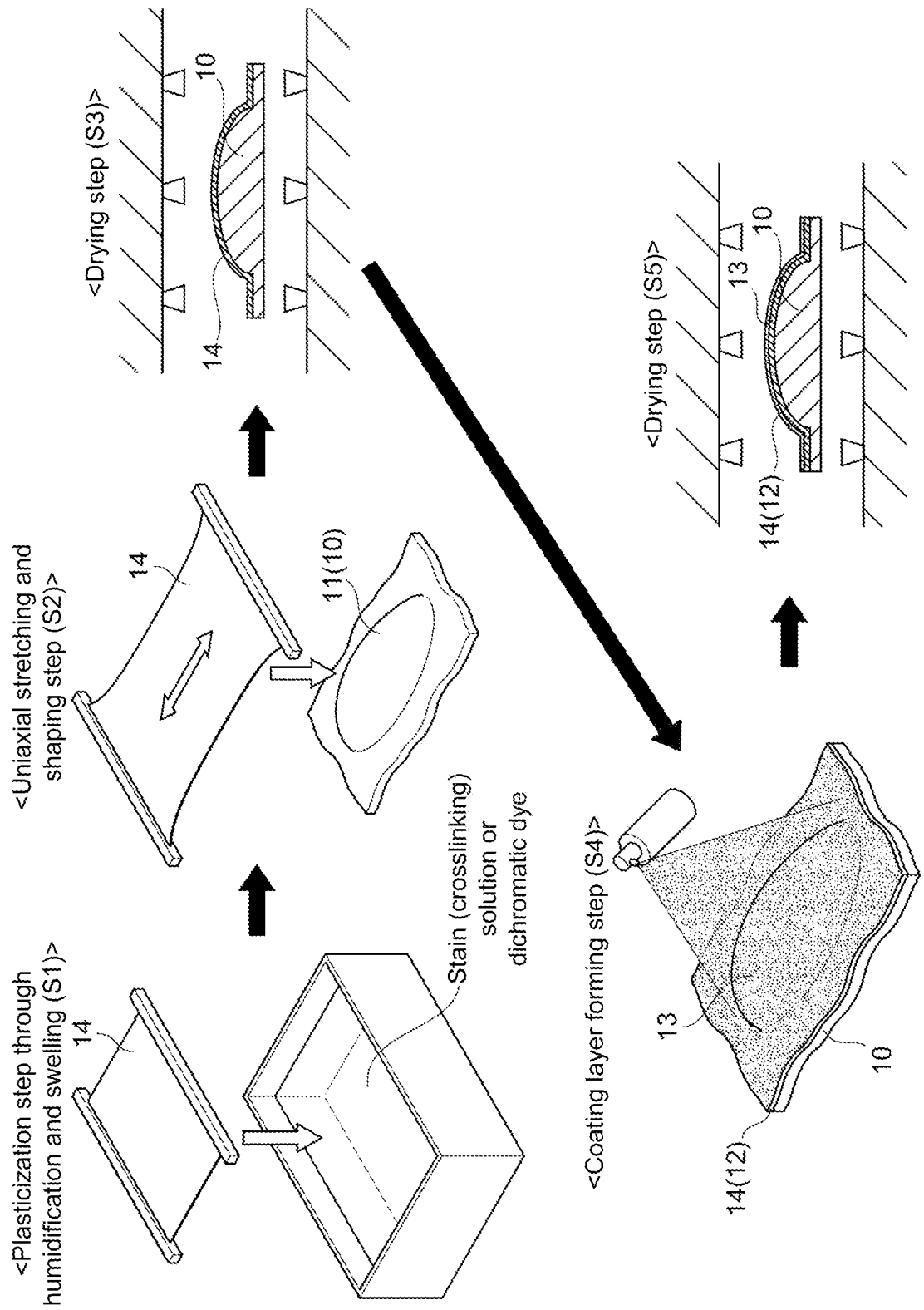
FIG. 3 is a view illustrating a method for producing the instrument panel illustrated in FIG. 1.

FIG. 3 is a view illustrating a method for producing the instrument panel 10 illustrated in FIG. 1.

As illustrated in FIG. 3, first, a film 14 with a predetermined shape made of the aforementioned material is prepared. Then, the film 14 is doped with an iodine stain (crosslinking) solution (iodine doping) or dichromatic dye (dye doping) so that the film is humidified and swelled to be plasticized (S1: plasticization step through humidification and swelling).

Although the stain (crosslinking) solution doping for providing a polarizing property to the film 14 that combines the process of humidifying and swelling the film 14 is performed taking the production efficiency into consideration, such doping may be performed after the film 14 is shaped if color unevenness caused by the shaping is not tolerable.

Next, the film 14 plasticized in S1 is stretched uniaxially (specifically, in the vehicle width direction and in the oscillating direction of light to be absorbed) so that the film 14 is shaped in conformity with the surface shape of a product (specifically, the surface shape of the glossy portion 11 of the instrument panel 10 prepared in advance) through vacuum decompression, air-pressure pressing, or the like while at the same time the film 14 is provided with a polarizing property for absorbing optical oscillation components in the uniaxial direction, and the film 14 being stretched is attached to the surface of the product (S2: uniaxial stretching and shaping step).

Herein, to attach the film 14 to the surface of the product, a bonding layer may be provided on the film 14 in advance, or a bonding layer (agent) may be formed on the surface of the product through coating or the like.

Next, the instrument panel 10 having the film 14 attached thereto is put in a drying furnace or the like so that the attached film 14 is dried and fixed (S3: drying step).

Then, a coating layer 13 for protecting the polarizing layer 12, preventing scratching thereon, and preventing surface reflection, for example, is formed on the surface of the dried film 14 (that is, the polarizing layer 12) through spray coating or the like (S4: coating layer forming step), and the instrument panel 10 having the coating layer 13 formed thereon is put in a drying furnace or the like so that the coating layer 13 is dried and fixed (S5: drying step).

Through the aforementioned steps, the instrument panel 10 is produced that has formed on the surface of the glossy portion 11 the polarizing layer 12 for absorbing optical oscillation components in the vehicle width direction and the coating layer 13 for protecting the polarizing layer 12, for example.

With the conventional production method, it has been difficult to provide a polarizing property to a member having a complex shape with a number of projections and recesses, such as an automobile component (that is, the flexibility in shape has been low). In contrast, according to the production method of this example, since the film 14 can be deformed in keeping with the shape of a target member, the film 14 can be provided with a polarizing property even when the member has a complex shape (that is, the film 14 can be formed as a polarizing member), and thus the flexibility in shape can be significantly improved.

As described above, in this embodiment, the polarizing layer 12 provided on the surface of the glossy portion 11 absorbs s-polarized light (optical oscillation components of the incident sunlight in the vehicle width direction), and passes p-polarized light therethrough. Therefore, the glossy portion 11 reflects only p-polarized light. Since the p-polarized light (optical oscillation components of the incident sunlight in the vehicle length direction) is the optical oscillation components perpendicular to the windshield 5, the Brewster's angle at which no reflection occurs is present, and thus reflection can be reduced (if s-polarized light is present, there will be no Brewster's angle, and thus reflection tends to become stronger). Therefore, light coming through the windshield 5 and reflected by the glossy portion 11 is not reflected much by the inner surface of the windshield, which can reduce a feeling of discomfort to passengers, such as a driver. Therefore, a burden for the passengers caused by reflected light generated due to a mirror phenomenon and the like can be reduced while at the same time the design can be enhanced.

It should be noted that the aforementioned embodiment has mainly illustrated an example in which, in the vehicle 1 having the instrument panel 10, which is an interior member arranged in the front part of the vehicle 1, and the windshield 5 with a portion overlapping the instrument panel 10 in the vertical direction, the polarizing layer 12 is provided on the surface of the glossy portion 11 on the instrument panel 10, whereby reflection by the windshield 5 (or the inner surface thereof) (mirror-like reflection or reflection in the window) is suppressed. However, it is needless to mention that the present disclosure is also applicable to, in a vehicle having a rear window, a roof window, and the like, an interior member provided at a position overlapping the rear window, the roof window, or the like in the vertical direction.

Although the embodiments of the present disclosure have been described in detail with reference to the drawings, a specific configuration is not limited thereto, and any design changes that are within the spirit and scope of the present disclosure are all included in the present disclosure.

DESCRIPTION OF SYMBOLS

1 Vehicle
5 Windshield (glass)
10 Instrument panel (interior member, polarizing member)
11 Glossy portion
12 Polarizing layer
13 Coating layer
14 Film

What is claimed is:

1. A method for producing an interior member, the interior member being adapted to be arranged at a position overlapping glass of a vehicle in a vertical direction, comprising:
   preparing an interior member with a glossy portion, the glossy portion configured to reflect light coming through the glass;
   humidifying and swelling a film so as to plasticize the film;
   uniaxially stretching the plasticized film so as to provide the film with a polarizing property to absorb optical oscillation components in the uniaxial direction;
   attaching the film to the glossy portion of the interior member while shaping the film to conform with a surface shape of the glossy portion by using vacuum decompression or air-pressure pressing;
   drying the attached film after being attached to the glossy portion of the interior member; and
   forming a coating layer on a surface of the dried film attached to the glossy portion, wherein the coating layer is configured to protect the polarizing property of the dried film.

* * * * *